United States Patent
Matsuo et al.

[11] Patent Number: 6,116,496
[45] Date of Patent: *Sep. 12, 2000

[54] METHOD AND APPARATUS FOR CONTINUOUS ROLLING BY REHEATING LOCALLY COLD PORTIONS PRODUCED BY CLAMPING DURING FLASH-BUTT WELDING

[75] Inventors: Giichi Matsuo; Susumu Okawa, both of Yokohama; Hiroshi Fujii, Chigasaki, all of Japan

[73] Assignee: NKK Corporation, Tokyo, Japan

[*] Notice: This patent is subject to a terminal disclaimer.

[21] Appl. No.: 08/876,652

[22] Filed: Jun. 16, 1997

[30] Foreign Application Priority Data

Jun. 28, 1996 [JP] Japan .................................. 8-168865

[51] Int. Cl.⁷ .............................. B23K 5/22; B23K 37/00; B23K 13/01; H05B 6/16
[52] U.S. Cl. ............................. 228/212; 228/4.1; 228/5.7; 228/49.4; 228/234.1; 219/614; 219/655
[58] Field of Search ..................................... 219/610, 617, 219/614, 655; 72/202, 342.1; 228/4.1, 5.7, 230, 231, 212, 234.1, 49.4; 29/336

[56] References Cited

U.S. PATENT DOCUMENTS

| | | |
|---|---|---|
| 2,163,967 | 6/1939 | Strawn et al. . |
| 4,627,259 | 12/1986 | Andersson et al. ........................ 72/202 |
| 4,857,687 | 8/1989 | Andersson et al. .................. 219/10.57 |
| 5,063,767 | 11/1991 | Drummond . |
| 5,172,846 | 12/1992 | Hayashi et al. . |
| 5,306,365 | 4/1994 | Reighard ................................. 148/688 |
| 5,323,951 | 6/1994 | Takechi et al. .......................... 228/102 |
| 5,396,050 | 3/1995 | Ebihara et al. .......................... 219/603 |
| 5,461,770 | 10/1995 | Kimura et al. .......................... 29/527.7 |
| 5,542,165 | 8/1996 | Coassin et al. ............................... 29/33 |
| 5,598,729 | 2/1997 | Hoffmann et al. .......................... 72/8.5 |
| 5,774,973 | 7/1998 | Aoyama et al. ........................ 29/526.2 |
| 5,787,565 | 8/1998 | Matsuo et al. ........................... 29/526.4 |
| 5,829,117 | 11/1998 | Okawa et al. . |
| 5,845,527 | 12/1998 | Hoffmann et al. ........................... 72/69 |
| 5,931,370 | 8/1999 | Poloni et al. ............................. 228/156 |

FOREIGN PATENT DOCUMENTS

| | | |
|---|---|---|
| 2836338 | 2/1980 | Germany . |
| 52-43754 | 4/1977 | Japan . |
| 57-11722 | 3/1982 | Japan . |

*Primary Examiner*—Patrick Ryan
*Assistant Examiner*—Kiley Stoner
*Attorney, Agent, or Firm*—Frishauf, Holtz, Goodman, Langer & Chick, P.C.

[57] ABSTRACT

A method of continuous rolling comprises the steps of: forming a continuous billet 20 by joining a rear end of preceding billet 21 with a front end of succeeding billet 21 by flash-butt welding 3; removing burr on welded portions of the continuous billets 20; then rolling the continuous billet 20 in a rolling mill line 6; wherein locally cold portions produced by clamping at welding are reheated after removing the burr using a travelling induction-heating unit 5 running at a speed synchronously with a running speed of the continuous billet 20, which travelling induction-heating unit 5 is provided with induction-heating coils arranged at the same distance with that of the locally cold portions.

4 Claims, 3 Drawing Sheets

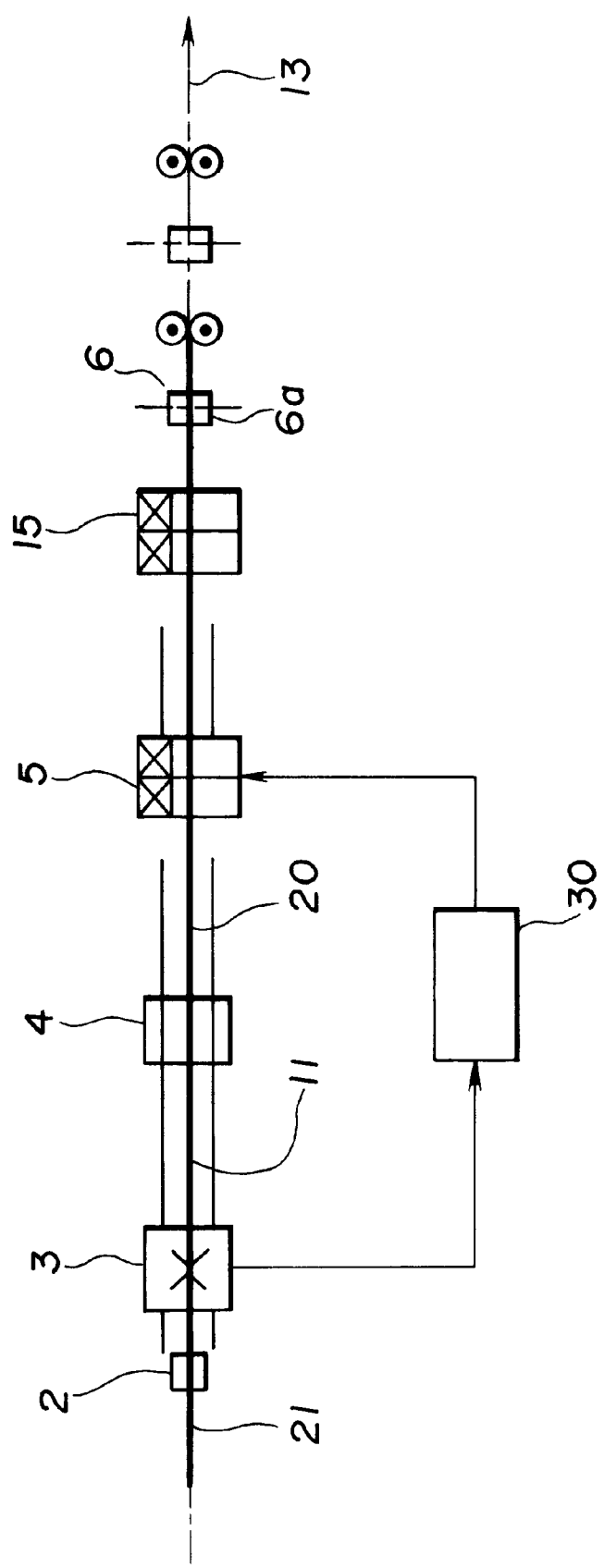

METHOD AND APPARATUS FOR CONTINUOUS ROLLING BY REHEATING LOCALLY COLD PORTIONS PRODUCED BY CLAMPING DURING FLASH-BUTT WELDING

BACKGROUND OF THE INVENTION

1. Field of the Invention

The present invention relates to a method of continuous rolling by means of welding billets before rolling, and an apparatus therefor, and particularly relates to a method and an apparatus applying induction-heating treatment to the welded billets.

2. Description of the Related Art

A known continuous rolling method to produce wire, rod, or shape steel with energy-saving and high efficiency comprises the steps of discharging billets from a reheating furnace one at a time, welding the rear end of a preceding billet with the front end of a succeeding billet by a single unit travelling flash-butt welder, removing the burr on the welded portions using a scarfer or the like, reheating thus formed continuous billet to a temperature necessary for rolling by a stationary induction-heating unit, then rolling the continuous billet in a rolling mill line: (disclosed in, for example, unexamined Japanese patent publication No.52-43754 (1977)).

There is an another continuous rolling method in which billets discharged from a reheating furnace are joined together by a single unit travelling flash-butt welder to form a continuous billet, and the continuous billet is reheated again in the reheating furnace, followed by being rolled: (disclosed in, for example, examined Japanese patent publication No.52-11722(1982)).

The inventors of the present invention previously proposed a hot direct rolling method (hereinafter referred to simply as "HDR") for rolling the billets directly sent from a continuous casting machine. In the HDR method, induction-heating is applied for reheating treatment of the billets. The induction-heating aims at:

(1) Reheating the billets during a period from cutting thereof in the continuous casting machine (hereinafter referred to simply as "CCM") to direct feeding thereof to the inlet of a rolling mill line;

(2) Reducing the temperature difference between front end and rear end of billets produced at cutting thereof in CCM, (temperature distribution is induced from time difference after casting).

These aims have been achieved by changing electric power given to a stationary induction-heating unit depending on inlet temperature of billet or by changing running speed of billet.

When continuously rolling billets that are not only reheated in a reheating furnace but also directly fed from CCM, it is very difficult by a stationary reheating method to uniform the induced temperature distribution. In addition, the running speed of billets cannot be changed through a heating unit in a continuous rolling method.

SUMMARY OF THE INVENTION

The object of the present invention is to provide a method of continuous rolling and an apparatus therefor to achieve uniform temperature distribution over the billets.

A method of continuous rolling according to the present invention comprises the steps of: forming a continuous billet by joining a rear end of preceding billet with a front end of succeeding billet by flash-butt welding; removing the burr on welded portions of the billets; then rolling the continuous billet in a rolling mill line; wherein locally cold portions produced by clamping at welding are reheated after removing the burr using a travelling induction-heating unit running at a speed synchronously with a running speed of the continuous billet, which travelling induction-heating unit is provided with induction-heating coils arranged at the same distance with that between the locally cold portions.

It is more preferable that the continuous billet described above may be further reheated by a stationary induction-heating unit before entering a rolling mill line.

The above-mentioned method can be realized by an apparatus of continuous rolling comprising: a flash-butt welder for joining a rear end of preceding billet with a front end of succeeding billet; a means for removing burr on welded portions of the billets; and a travelling induction-heating unit which is provided with induction-heating coils arranged at the same distance with that between locally cold portions produced by clamping at welding and which functions after burr-removing step at a running speed synchronously with a running speed of the continuous billet.

The apparatus may be optionally provided with a stationary induction-heating unit following the travelling induction-heating unit to further heat the continuous billet.

According to the present invention, since the locally cold portions produced by clamping at welding are reheated by induction-heating using a travelling induction-heating unit running at a speed synchronously with a running speed of continuous billet, which travelling induction-heating unit is provided with induction-heating coils arranged at the same distance with that between the locally cold portions, the uniform temperature distribution can be achieved over the billet.

When billets are directly fed from CCM, reheating for rolling or for removing a saw-tooth profile (as will be shown in FIG. 1(a), the combined profile of temperature distribution of each billet seems to be a saw-tooth.) is required, in some cases. For these cases, a stationary induction-heating unit may be applied to perform the reheating.

BRIEF DESCRIPTION OF THE DRAWINGS

FIG. 3 shows an another example of apparatus of continuous rolling according to the present invention.

DESCRIPTION OF THE PREFERRED EMBODIMENT

Before entering the detailed description of an apparatus of continuous rolling according to preferred embodiment of the present invention, the relationship between billet temperature distribution and location of a travelling induction-heating unit used in the present invention is discussed in the following.

Figure 1A:
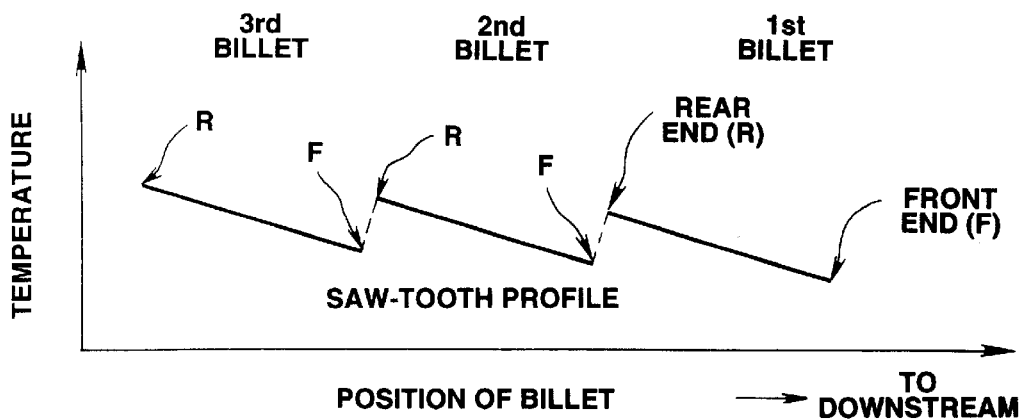
FIG. 1(a) illustrates temperature distribution of billets directly fed from CCM.
Figure 1B:
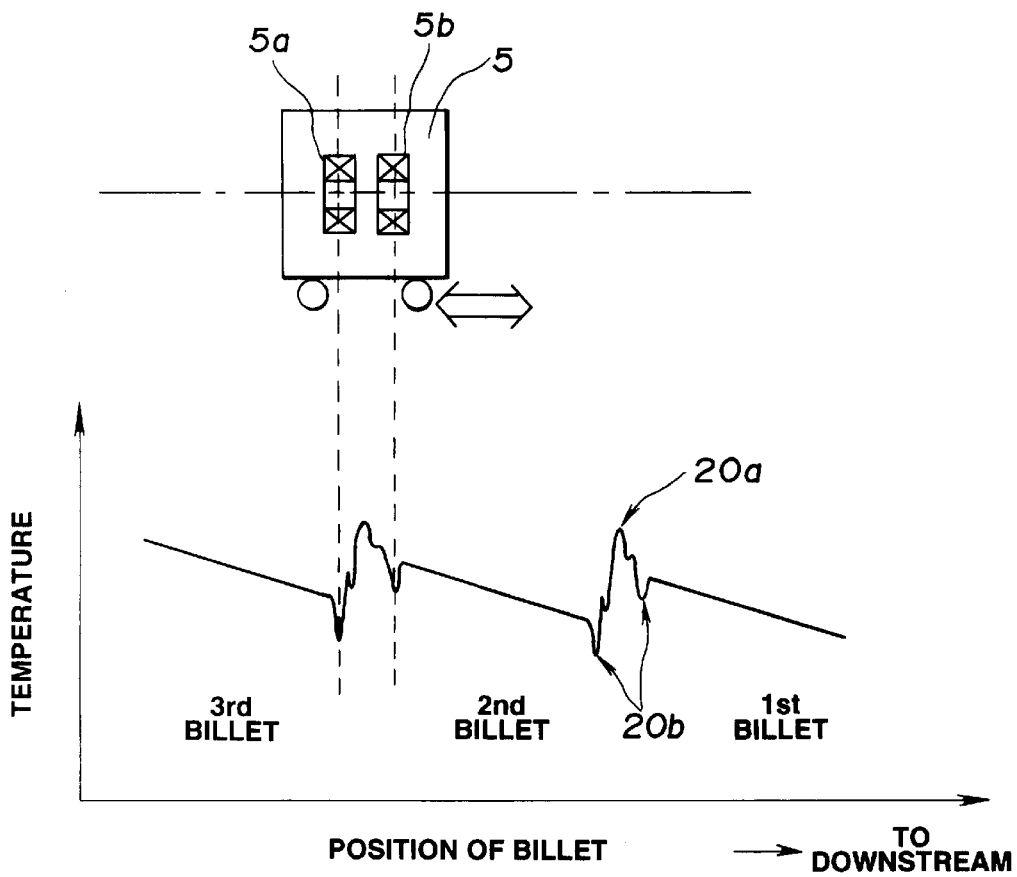
FIG. 1(b) illustrates relationship between temperature distribution after welding and location of travelling induction-heating unit.

FIG. 1(a) illustrates temperature distribution of billets directly fed from CCM, showing temperature decrease from rear end to front end thereof. FIG. 1(b) illustrates relationship between temperature distribution after welding and location of induction-heating unit. The temperature distribution after welding shown in FIG. 1(b) is characterized by the fact that the temperature becomes high at a welded portion 20a and becomes low at portions 20b clamped at welding. The pitch of a pair of induction-heating coils 5a, 5b matches the distance between clamped portions 20b shown in FIG. 1(b).

With a method for letting billets pass through an induction-heating coil of a stationary induction-heating unit, the uniformity of the temperature of above-described locally hot portion 20a and locally cold portions 20b is not able to be obtained. The heating to uniform the temperature at the locally cold portions 20b becomes possible when the induction-heating coils 5a, 5b are arranged matching the distance between the clamped portions 20b and when the induction-heating is applied while travelling the induction-heating coils at a speed synchronous with the running speed of the continuous billet. For a case of 40 sec. pitch billets, for example, sufficient heating time is assured by setting 25 sec. for synchronous travelling for heating and 15 sec. for returning to home position.

As seen in FIG. 1(b), the continuous billet includes in the longitudinal direction the saw-tooth temperature profile caused by direct feeding of billets from CCM and the local temperature distribution occurred during welding step. Particularly for the case that the billets are sent directly from CCM, the maximum temperature for cutting has a limitation so that the temperature becomes sometimes lower than an adequate temperature for rolling because of an excessively long time for the billet to reach the inlet of a rolling mill line. In such a case, it is necessary to fully heat the billet. Judging from experienced data, the following actual temperatures are obtained.

Adequate Inlet Temperature: 950–1000° C.

Temperature distribution caused from CCM: within 50° C. (difference between cross sectional average temperatures)

Temperature at CCM cutting point: 1200° C. (average temperature of cut section)

Temperature decrease at clamped portions: −300 to −400° C. to a normal surface temperature Temperature distribution of a billet differs between the case that the billets are discharged from a reheating furnace and the case that the billets are directly sent from CCM. The following procedures necessary for each of these cases.

(I) Discharge of Billets from Reheating Furnace

In that case, the temperature is possible to be controlled in an ordinary reheating furnace, and there is no saw-tooth profile different from the case of direct feeding.

Accordingly, it is necessary to uniform only the local temperature distribution. As a result, as seen in FIG. 1(b), the optimum procedure of the induction-heating unit 5 is to adopt the induction-heating coils 5a, 5b arranged matching the cold portions 20b and then to travel the induction-heating coils 5a, 5b at a speed synchronous with the running speed of continuous billet 20.

(II) Direct Feeding of Billets from CCM, (HDR process)

In that case, it is necessary to raise temperature and to remove temperature distribution caused from CCM.

(i) Temperature to be Raised

Temperature to be raised depends on time, atmosphere, heat-holding condition, billet size, and the like of from billet-cutting in CCM to billet-joining to form a continuous billet. The computation to reproduce the temperature to be raised is possible by means of our temperature-history computation system employing the above conditions. Generally speaking, the raise of temperature is not necessary when the billet is rolled within 200 to 400 sec., or shorter after cutting thereof.

(ii) Temperature Distribution Caused from CCM

The temperature distribution is also computed using various parameters, though the billet length significantly affects thereto.

Generally, for a billet having a size of 150 mm square and 7 m or less length casted at a speed of 2.8 m/min., if the table rearward of a shear is equipped with a heat-holding cover, then 50° C. or less of temperature distribution can be controlled. Accordingly, even in the case of direct feeding of billet from CCM, there is no need of removing saw-tooth temperature profile, in some cases. It is, however, often necessary to heat the billets produced under conditions other than those described above. In such a case, it may be optimal to use not only a travelling induction-heating unit, but also a stationary induction-heating unit.

Now that the relation between the billet temperature and the induction-heating unit has become clear, one preferred embodiment of apparatus according to the present invention wii be discussed in the following.

Figure 2:
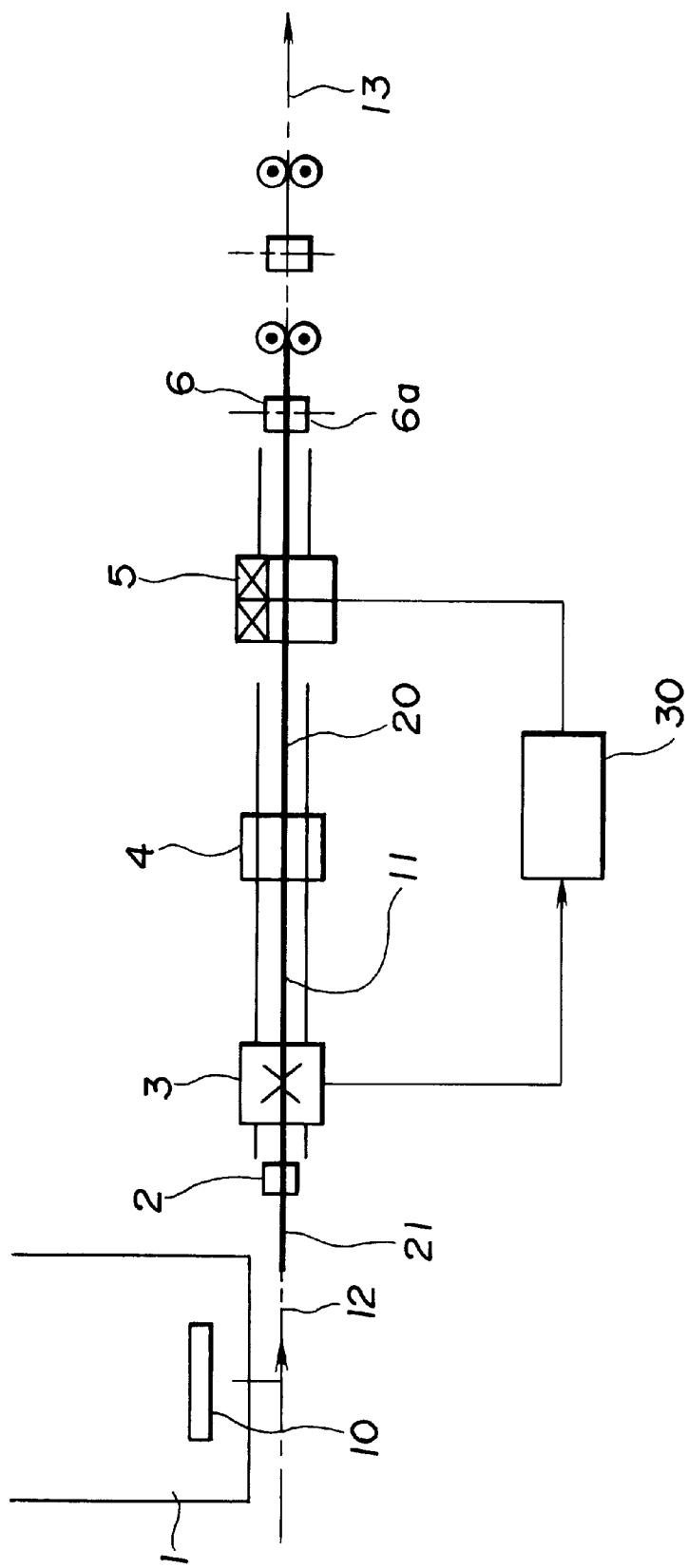
FIG. 2 shows an example of apparatus of continuous rolling according to the present invention.

FIG. 2 shows an example of apparatus of continuous rolling according to the present invention. The continues rolling apparatus comprises a reheating furnace 1, a descaler 2, a travelling flash-butt welder (hereinafter referred to simply as "travelling welder") 3, a travelling grinding machine 4, a travelling induction-heating unit 5, and a rolling mill line 6. The rolling mill line 6 comprises a plurality of stands, though the figure shows only the first stand 6a. In this continuous rolling apparatus, the transportation line 12 of billets 10 and the rolling line 13 of the rolling mill line 6 match by each other to form a single manufacturing line 11. The descaler 2, the travelling welder 3, the travelling grinding machine 4, the travelling induction-heating unit 5, and the rolling mill line 6 are located in the sequential order on the manufacturing line 11.

A billet 21 which was discharged from the reheating furnace 1 is fed at a timing that a rear end of a continuous billet 20 which was formed by welding individual billets together arrives at the home position of the travelling welder 3, to catch up with the continuous billet 20. At the moment that both billets 20 and 21 contact each other, the flash-butt welding thereof is conducted while letting the travelling weldier 3 run at a speed synchronous with the running speed of the continuous billet 20.

The travelling grinding machine 4 is located at downstream side of the travelling welder 3 to conduct burr-removal from the portions welded by the travelling welder 3. Since the cycle time of burr-removal is 30 sec. or less, a single unit of the travelling grinding machine 4 functions satisfactorily. The travelling induction-heating unit 5 is located at inlet of the first stand 6a of the rolling mill line 6 for raising temperature of the cold portions on the continuous billet 20.

The travelling induction-heating unit 5 is provided with induction-heating coils at a pitch shown in FIG. 1(b). A control unit 30 detects the welded portion formed by the travelling welder 3 and detects the running speed of the continuous billet 20. Thus, the control unit 30 tracks the welded portion, and detects the arrival of the cold portions at the place equipped with induction-heating coils of the travelling induction-heating unit 5. After that, the control unit 30 makes the travelling induction-heating unit 5 run synchronously with the running speed of the continuous billet 20 to raise the temperature of the cold portions, then feeds the continuous billet 20 into the first stand 6a of the rolling mill line 6. Thus, the temperature of the continuous billet 20 at that moment is controlled adequately for rolling.

FIG. 3 shows another example of apparatus of continuous rolling according to the present invention. This apparatus of continuous rolling is applied to the case of direct billet feeding from CCM. The apparatus has the same configuration with that in FIG. 2 having a descaler 2, a travelling welder 3, a travelling grinding machine 4, a travelling induction-heating unit 5, and a rolling mill line 6, except that the apparatus further has a stationary induction-heating unit 15 between the travelling induction-heating unit 5 and the rolling mill line 6.

The travelling induction-heating unit 5 raises the temperature of a billet while travelling over the cold portions, as described above, then the stationary induction-heating unit 15 heats the continuous billet 20 to remove a saw-tooth profile and to get an adequate temperature for rolling. After that, the continuous billet 20 is fed to the first stand 6a of the rolling mill line 6.

What is claimed is:

1. A method of continuous rolling comprising the steps of:
    forming a continuous billet by joining a rear end of a preceding billet with a front end of a succeeding billet by flash-butt welding;
    removing burr on welded portions of the billets;
    rolling the continuous billet in a rolling mill line;
    wherein locally cold portions produced by clamping at welding are reheated after removing the burr using a travelling induction-heating unit which moves at a rate which is synchronous with a movement of the continuous billet, the travelling induction-heating unit having induction-heating coils which are spaced from one another to coincide with the distance between clamped portions which produce the locally cold portions.

2. The method as defined by continuous rolling of claim 1, wherein the continuous billet which was reheated by induction-heating using the travelling induction heating unit is further reheated using a stationary induction heating unit before entering the rolling mill line.

3. Apparatus for continuous rolling comprising:
    a flash-butt welder for joining a rear end of a preceding billet with a front end of a succeeding billet;
    means for removing burr on welded portions of the billets; and
    a travelling induction-heating unit having induction-heating coils which are spaced from one another to coincide with the distance between the locally cold portions produced by clamping during welding and which function after burr-removal at a speed which is synchronous with a movement of the continuous billet.

4. Apparatus for continuous rolling as defined by claim 3 further comprising a stationary induction-heating unit which follows the travelling induction-heating unit.

\* \* \* \* \*